United States Patent [19]

Flamholz

[11] 3,746,455
[45] July 17, 1973

[54] DIMENSIONAL MEASUREMENT TECHNIQUE USING OPTICAL FILTERING

[75] Inventor: Alexander L. Flamholz, Poughkeepsie, N.Y.

[73] Assignee: International Business Machines Corporation, Armonk, N.Y.

[22] Filed: Mar. 8, 1971

[21] Appl. No.: 121,901

[52] U.S. Cl. .............................. 356/168, 350/162
[51] Int. Cl. ........................................ G01b 11/24
[58] Field of Search ........................... 356/156, 168; 350/162

[56] References Cited
UNITED STATES PATENTS

| | | | |
|---|---|---|---|
| 3,614,232 | 10/1971 | Mattisen | 356/168 X |
| 2,969,708 | 1/1961 | Polanyi et al. | 356/102 |
| 3,299,273 | 1/1967 | Sturdevant | 356/168 |
| 3,518,007 | 6/1970 | Ito | 350/162 |
| 3,503,687 | 3/1970 | Venema | 356/106 |
| 3,586,865 | 6/1971 | Baker et al. | 356/156 |
| 3,503,684 | 3/1970 | Preston, Jr. et al. | 350/160 SF |
| 3,469,921 | 9/1969 | Taylor | 350/162 |

OTHER PUBLICATIONS

The Univ. of Mich. Engineering Summer Conferences, July 24–Aug. 4, 1967, "Introduction to Optical Data Processing."
G. D. Dew, Optica Acta, Apr. 1970, Vol. 17, No. 4, pp. 237–257.
G. G. Lendaris et al., IEEE Proceedings, Vol. 58, No. 2, Feb. 1970, pp. 198–216.

*Primary Examiner*—Ronald L. Wibert
*Assistant Examiner*—Paul K. Godwin
*Attorney*—Hanifin & Jancin and Martin G. Reiffin

[57] ABSTRACT

A dimensional measurement technique for measuring the sizes of holes in an object under test. The object is exposed to radiation from a coherent light source so as to transmit the radiation through the holes. An annular spatial bandpass filter removes from the transmitted radiation all frequency components outside the pass band. The intensity of the reimaged filtered radiation is then measured to determine the sizes of the holes.

12 Claims, 7 Drawing Figures

INVENTOR
ALEXANDER L. FLAMHOLZ

BY Martin G. Reiffin

ATTORNEY

DIMENSIONAL MEASUREMENT TECHNIQUE USING OPTICAL FILTERING

BACKGROUND OF THE INVENTION

1. Field of the Invention

The concept and techniques of spatial frequency are basic to the subject invention. It is well known that any time domain signal has a corresponding frequency spectrum having the dimensions of 1/time such as 1/second or Hz. In a directly analogous fashion, any spatial domain signal, such as transmission or reflection as a function of position, has a spatial frequency spectrum and an associated spatial frequency having the dimensions of 1/distance or 1/mm or lines/inch. It is thus clear that any spatial information carrying system has a spatial frequency spectrum which gives the relative distribution of energy among the continuous frequency components of the objects.

2. Description of the Prior Art

It is well known in the prior art that separation of the unique spatial frequency components can be performed by the process of optical diffraction. When an object is illuminated by a coherent plane wave front (from a laser, for example) having a wave length $\lambda$, each point in the object diffracts light over all forward angles. At each point the diffraction angle is proportional to $\lambda$ times the spatial frequency so that each separate spatial frequency component is diffracted at a unique angle in the frequency plane, the diffracted light which arises from the DC component of the object is imaged on the axis, while the energy at the higher spatial frequencies is imaged off axis at a distance proportional to the magnitude of the frequency. With the isolation and separation of the object's frequency spectrum in the back focal plane of the lens, spatial frequency filtering can be accomplished by modifying or removing selected portions of the frequency plane. High-pass filtering can be easily implemented by placing an opaque disk on the axis in the frequency plane, while low-pass filtering is accomplished by placing a clear disk on the axis.

SUMMARY OF THE INVENTION

In accordance with the present invention, a bandpass spatial filter is employed which cuts off both the high and low frequencies beyond the predetermined pass band. The intensity of the reimaged filtered radiation is then measured as a function of the hole sizes which can thereby be determined.

A primary object of the present invention is to provide a method and apparatus for measuring the sizes of holes in masks used in the fabrication of integrated circuits and other objects having holes therein.

This is achieved by exposing the object to radiation from a coherent light source so as to transmit the radiation through the holes. The transmitted radiation is then filtered to remove all frequency components outside a predetermined pass band, and the intensity of the reimaged filtered radiation is then measured to determine the hole diameters. The spatial filter comprises an opaque circular or rectangular area surrounded by one or more concentric annular transparent areas which may also be circular or rectangular. The central opaque area removes the low-frequency components of the transmitted light and the opaque areas exterior to the annular transparent areas remove the high-frequency components.

The present invention, although disclosed as measuring the holes in integrated circuit masks, is not so limited and may be employed in the measurement of arrays of holes in many aspects of component manufacture such as via holes in multi-layer ceramic substrates, holes in printed circuit cards, and circular patterns in photolithographic masks and other devices. The invention may also be employed in the measurement of rectangular objects such as aluminum conductor stripes.

DESCRIPTION OF THE PREFERRED EMBODIMENTS

Figure 1:
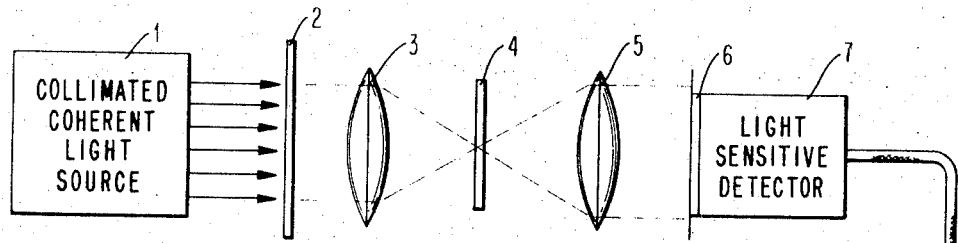
FIG. 1 is a schematic diagram of an optical filtering system in accordance with the present invention.

Referring first to FIG. 1, there is shown a schematic diagram of an optical filtering system in accordance with the present invention. The reference numeral 1 designates a collimated coherent light source from which light is transmitted to an object 2. The latter may be an integrated circuit mask containing holes whose sizes are to be determined. The object 2 is located in the front focal plane of a lens 3. In the rear focal plane of the latter, is an optical filter 4 to be described in detail below.

The filter 4 is located in the front focal plane of the lens 5. The latter projects the image at its rear focal plane 6 at which is located a light sensitive detector 7 of any conventional type. A signal amplitude detector 8 determines the amplitude of the signal detected by the light sensitive detector 7. The signal is displayed or recorded at 9.

Figure 2:
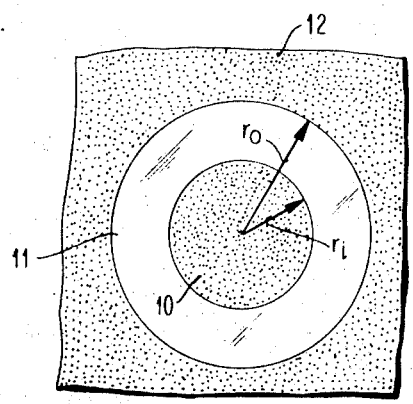
FIG. 2 shows an annular filter.

The optical bandpass filter 4 may be in the form shown in FIG. 2 comprising a central opaque area 10 surrounded by transparent annular area 11, in turn surrounded by an opaque area 12. The radius of the central opaque area 10 is designated $r_i$ and the outer radius of the transparent annular area 11 is designated $r_o$. The inner area 10 blocks out the DC and low frequency components of the image and the outer area 12 blocks out the high frequency components.

Figure 3:
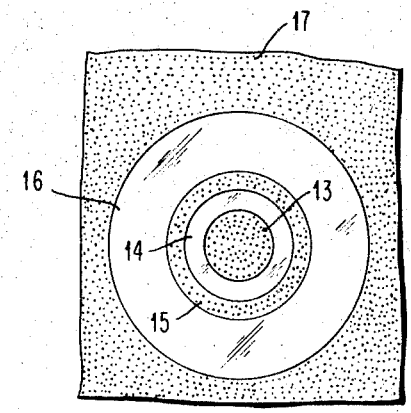
FIG. 3 shows a filter comprising a plurality of concentric circular transparent annuli.

To obtain greater sensitivity, the optical filter 4 may be in the form shown in FIG. 3. A central opaque area 13 is surrounded by an annular transparent area 14, in turn surrounded by an opaque area 15. The latter is surrounded by a transparent annular area 16 and an outer opaque area 17.

Figure 4:
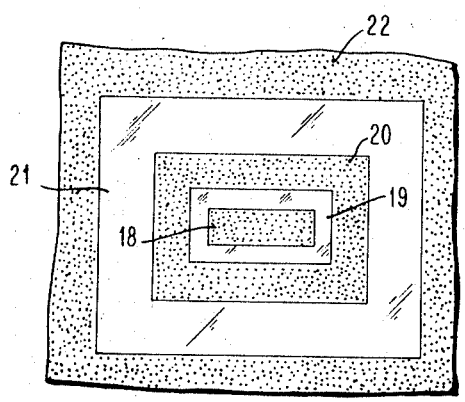
FIG. 4 shows a filter comprising a plurality of concentric rectangular transparent annuli.

The circular optical filters shown in FIGS. 2 & 3 are for use in the measurement of circular objects such as round holes. If it is desired to measure rectangular objects, the optical filter must be appropriately shaped as shown in FIG. 4. A central rectangular opaque area 18 surrounded by a rectangular transparent area 19, in turn surrounded by an opaque rectangular area 20, in turn surrounded by a transparent rectangular area 21.

The latter is surrounded by an outer opaque area 22. The term "annular" as used in the specification and claims is intended to refer to both circular and rectangular filter areas.

Figure 5:
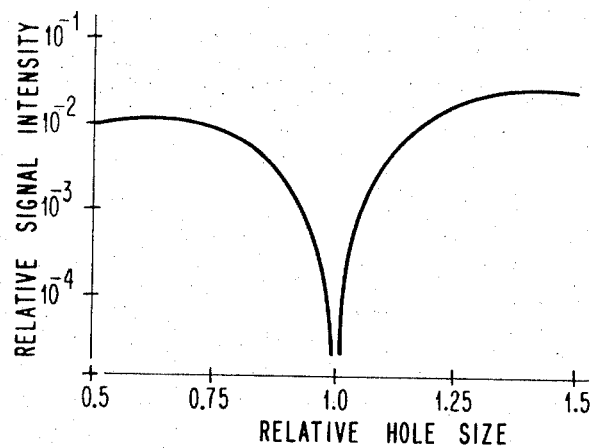
FIG. 5 is a graph showing the relative signal intensity plotted as a function of hole size.

Referring now to FIG. 5, there is shown a plot of relative signal intensity as a function of normalized hole size. It will be seen that there is a sharp dip in the signal intensity at the hole size for which the filter is designed.

Figure 6:
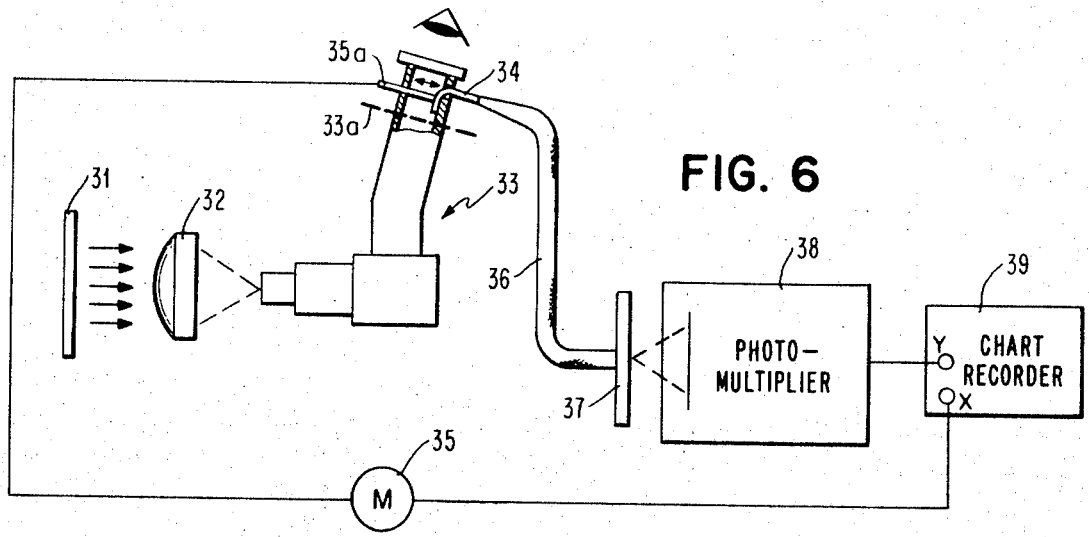
FIG. 6 shows an apparatus for scanning the relative signal intensity.
Figure 7:
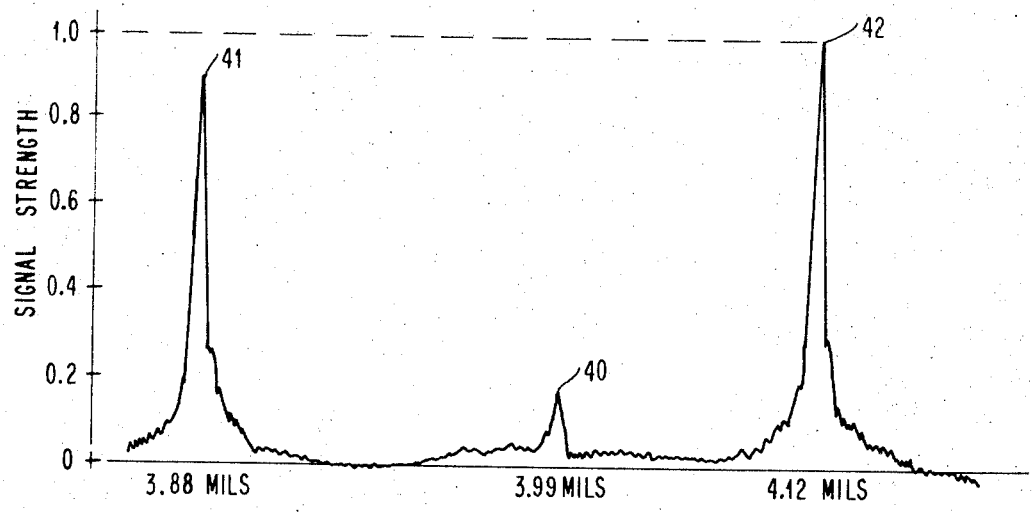
FIG. 7 shows a scan made by the apparatus of FIG. 6.

Referring now to FIG. 6, there is shown a practical apparatus for scanning the filtered image and thereby determining the hole size. The filtered image is shown at 31 which corresponds to the image 6 in FIG. 1. The filtered image is transmitted by a lens 32 and a microscope 33. At the image plane 33a in the eyepiece of the latter is the open end of an optical fiber 34 connected to a light pipe 36. A motor 35 drives a linkage 35a which causes optical fiber 34 to move across the image plane 33a of microscope 33. The image is transmitted to a diffuser 37 and photomultiplier 38 from which the signal is taken to a chart recorder 39. The latter is actuated by the motor 35. The output of the chart recorder 39 is shown in FIG. 7, where it will be seen that the peak 40 for a hole size of 3.99 mils. is very much less than the peak 41 for a hole size of 3.88 mils. and the peak 42 for a hole size of 4.12 mils.

Referring again to FIG. 2, there will now be described the formula for determining the inner radius of the annulus $r_i$ as a function of the outer radius $r_o$, wavelength $\lambda$, lens focal length $f$, and radius $R_o$ of the hole being measured. More specifically, $$r_i = u_i \lambda f / 2 \pi R_o$$

where $u_i$ is such that the Bessel function $$J_0(u_i) = J_0(u_o)$$

for $$u_o = 2\pi R_o r_o / \lambda f$$

It is to be understood that the specific embodiments disclosed herein are merely illustrative of several of the many forms which the invention may take in practice and that numerous modifications thereof will readily occur to those skilled in the art without departing from the scope of the invention as delineated in the appended claims, and that the claims are to be construed as broadly as permitted by the prior art.

I claim:

1. In a dimensional measurement apparatus including a coherent light source,
a first lens spaced from said light source,
a second lens coaxial with said first lens and spaced therefrom,
a spatial filter coaxial with and located between said two lenses, and
means for measuring the energy of the light transmitted through said lenses and said filter,
the improvement wherein said spatial filter is a bandpass filter having low frequency and high frequency cut-offs,
said filter comprising a transparent annulus having an inner radius $r_i$ and an outer radius $r_o$ such that $$r_i = u_i \lambda f / 2 \pi R_o$$

where $u_i$ is such that the Bessel function $$J_o(u_i) = J_o(u_o) \text{ for}$$

$$u_o = 2\pi R_o r_o / \lambda f \text{ and where}$$

$\lambda$ = wavelength of the coherent light source
$f$ = focal length of the first lens
$R_o$ = radius of hole being measured
$r_o$ = outer radius of the annulus
$r_i$ = inner radius of the annulus.

2. An apparatus for measuring the size of a hole in an object under test, said apparatus comprising
a first lens,
means for holding the object under test substantially at the object focal plane of said first lens,
spatially coherent light source means for exposing said object to coherent light radiation so as to transmit said radiation through said hole,
a second lens coaxial with and spaced from said first lens,
bandpass spatial filter means coaxial with and located between said two lenses at the object focal plane of said second lens and at the image focal plane of said first lens for filtering out from said transmitted radiation all frequency components outside a predetermined passband, and
means located substantially at the image focal plane of said second lens for measuring the intensity of the filtered light radiation transmitted thereto,
said filter means comprising a plurality of concentric transparent annuli.

3. An apparatus for measuring the size of a hole in an object under test, said apparatus comprising
a first lens,
means for holding the object under test substantially at the object focal plane of said first lens,
spatially coherent light source means for exposing said object to coherent light radiation so as to transmit said radiation through said hole,
a second lens coaxial with and spaced from said first lens,
bandpass spatial filter means coaxial with and located between said two lenses at the object focal plane of said second lens and at the image focal plane of said first lens for filtering out from said transmitted radiation all frequency components outside a predetermined passband, and
means located substantially at the image focal plane of said second lens for measuring the intensity of the filtered light radiation transmitted thereto,
said bandpass spatial filter means comprising an opaque circular area surrounded by a plurality of concentric annular circular transparent areas.

4. An apparatus for measuring the size of a hole in an object under test, said apparatus comprising
a first lens,
means for holding the object under test substantially at the object focal plane of said first lens,
spatially coherent light source means for exposing said object to coherent light radiation so as to transmit said radiation through said hole,
a second lens coaxial with and spaced from said first lens,
bandpass spatial filter means coaxial with and located between said two lenses at the object focal plane of said second lens and at the image focal plane of said first lens for filtering out from said transmitted radiation all frequency components outside a predetermined passband, and means located substantially at the image focal plane of said second lens for measuring the intensity of the filtered light radiation transmitted thereto, said filter means comprising a transparent annulus having an inner radius $r_i$ and an outer radius $r_o$ such that $r_i = u_i \lambda f/2\pi R_o$ where $u_i$ is such that the Bessel function $$J_o(u_i) = J_o(u_o)$$

for $$u_o = 2\pi R_o r_o/\lambda f \quad \text{and where}$$

$\lambda$ = wavelength of the coherent light source
$f$ = focal length of the first lens
$R_o$ = radius of hole being measured
$r_o$ = outer radius of the annulus
$r_i$ = inner radius of the annulus.

5. A dimensional measurement apparatus for measuring a dimension associated with an object under test and comprising
   a first lens having a front focal plane and a rear focal plane,
   means for holding the object under test at said front focal plane of said first lens,
   bandpass spatial filter means coaxial with and located at said rear focal plane of said first lens,
   a coherent light source to illuminate said object,
   a second lens coaxial with said first lens and having a front focal plane and a rear focal plane,
   said bandpass spatial filter means being located between said two lenses and at said front focal plane of said second lens, and
   a light sensitive detector located at said rear focal plane of said second lens,
   said filter means comprising a transparent annulus, said annulus being rectangular.

6. A dimensional measurement apparatus for measuring a dimension associated with an object under test and comprising
   a first lens having a front focal plane and a rear focal plane,
   means for holding the object under test at said front focal plane of said first lens,
   bandpass spatial filter means coaxial with and located at said rear focal plane of said first lens,
   a coherent light source to illuminate said object,
   a second lens coaxial with said first lens and having a front focal plane and a rear focal plane,
   said bandpass spatial filter means being located between said two lenses and at said front focal plane of said second lens, and
   a light sensitive detector located at said rear focal plane of said second lens,
   said filter means comprising a plurality of transparent concentric annuli having a common center.

7. An apparatus as recited in claim 6 wherein said annuli are circular.

8. An apparatus as recited in claim 6 wherein said annuli are rectangular.

9. A dimensional measurement apparatus for measuring a dimension associated with an object under test and comprising
   a first lens having a front focal plane and a rear focal plane,
   means for holding the object under test at said front focal plane of said first lens,
   bandpass spatial filter means coaxial with and located at said rear focal plane of said first lens,
   a coherent light source to illuminate said object,
   a second lens coaxial with said first lens and having a front focal plane and a rear focal plane,
   said bandpass spatial filter means being located between said two lenses and at said front focal plane of said second lens, and
   a light sensitive detector located at said rear focal plane of said second lens,
   said dimension being the size of a hole in the object under test and
   said filter means comprising a transparent annulus having an inner radius $r_i$ and an outer radius $r_o$ such that $r_i = u_i \lambda f/2 \pi R_o$ where $u_i$ is such that the Bessel function $$J_o(u_i) = J_o(u_o) \quad \text{for}$$

$$u_o = 2 \pi R_o r_o/\lambda f \quad \text{and where}$$

$\lambda$ = wavelength of the coherent light source
$f$ = focal length of the first lens
$R_o$ = radius of hole being measured $r_o$ = outer radius of the annulus
$r_i$ = inner radius of the annulus 10. A dimensional measurement apparatus for measuring a dimension associated with an object under test and comprising
    a coherent light source to illuminate said object,
    a first lens having a focal plane at the plane of said object,
    a second lens spaced from said first lens and having an image focal plane and an object focal plane,
    a light sensitive detector at said image focal plane of said second lens, and
    a bandpass spatial filter located between said two lenses and at the object focal plane of said second lens for filtering out all frequency components outside a predetermined passband,
    said annulus being rectangular.

11. A dimensional measurement apparatus for measuring the size of a hole in an object under test and comprising
    a coherent light source to illuminate said object,
    a first lens having a focal plane at the plane of said object,
    a second lens spaced from said first lens and having an image focal plane and an object focal plane,
    a light sensitive detector at said image focal plane of said second lens, and
    a bandpass spatial filter located between said two lenses and at the object focal plane of said second lens for filtering out all frequency components outside a predetermined passband,
    said filter comprising a transparent annulus having an inner radius $r_i$ and an outer radius $r_o$ such that $r_i = u_i \lambda f/2 \pi R_o$ where $u_i$ is such that the Bessel function $$J_o(u_i) = J_o(u_o) \quad \text{for}$$

$$u_o = 2 \pi R_o r_o/\lambda f \quad \text{and where}$$

$\lambda$ = wavelength of the coherent light source
$f$ = focal length of the first lens
$R_o$ = radius of hole being measured
$r_o$ = outer radius of the annulus
$r_i$ = inner radius of the annulus.

12. A dimensional measurement apparatus for measuring a dimension associated with an object under test and comprising a coherent light source to illuminate said object, a first lens having a focal plane at the plane of said object, a second lens spaced from said first lens and having an image focal plane and an object focal plane, a light sensitive detector at said image focal plane of said second lens, and a bandpass spatial filter located between said two lenses and at the object focal plane of said second lens for filtering out all frequency components outside a predetermined passband, said filter comprising a plurality of transparent concentric annuli.

* * * * *